US 12,477,990 B2

(12) United States Patent
Perez Ramirez et al.

(10) Patent No.: US 12,477,990 B2
(45) Date of Patent: Nov. 25, 2025

(54) GEARBOX ASSEMBLY

(71) Applicant: Deere & Company, Moline, IL (US)

(72) Inventors: Javier Jose Perez Ramirez, Mannheim (DE); Daniel Vergara Martinez, Mannheim (DE); Thomas Rohlfing, Mannheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/889,869

(22) Filed: Sep. 19, 2024

(65) Prior Publication Data

US 2025/0127091 A1 Apr. 24, 2025

(30) Foreign Application Priority Data

Oct. 24, 2023 (DE) .......................... 102023129240.4

(51) Int. Cl.
*A01D 69/06* (2006.01)
*F16H 57/021* (2012.01)
*F16H 57/029* (2012.01)
*F16H 57/02* (2012.01)

(52) U.S. Cl.
CPC ........... *A01D 69/06* (2013.01); *F16H 57/021* (2013.01); *F16H 57/029* (2013.01); *F16H 2057/02056* (2013.01)

(58) Field of Classification Search
CPC ...... A01D 69/06; A01D 34/30; F16H 57/021; F16H 57/029; F16H 2057/02056; F16C 33/6677
See application file for complete search history.

(56) References Cited

U.S. PATENT DOCUMENTS

| 4,157,045 A | * | 6/1979 | Suzuki | ................ F16H 57/0469 |
| | | | | 184/6.12 |
| 5,474,152 A | * | 12/1995 | Wilkinson | .............. F02N 15/00 |
| | | | | 192/113.32 |
| 6,273,214 B1 | * | 8/2001 | Schumacher | ......... F16H 57/043 |
| | | | | 184/6.12 |
| 7,708,664 B2 | * | 5/2010 | Schumacher | .......... A01D 34/30 |
| | | | | 56/297 |

(Continued)

FOREIGN PATENT DOCUMENTS

| EP | 2979530 A1 | 2/2016 |
| WO | 2006013188 A2 | 2/2006 |

*Primary Examiner* — Thomas C Diaz

(74) *Attorney, Agent, or Firm* — Taft Stettinius & Hollister LLP; Stephen F. Rost

(57) ABSTRACT

A gearbox assembly may include a gearbox housing, a transmission space enclosed by the gearbox housing, a first shaft mounted in the gearbox housing, a cavity formed in the first shaft, and a channel formed in the first shaft which connects the transmission space to the cavity of the first shaft for supplying lubricant. In the cavity, a second shaft may be rotatably mounted. The second shaft may have a first bearing area, a second bearing area, a gear area engaged with a ring gear to the gearbox housing, and a shaft end range from the cavity of the first shaft. A seal adjacent to the shaft end area may seal the cavity, and the outer diameter of the second shaft between the first bearing area and the shaft end area may be stepped at a shaft shoulder. The first bearing area may include a first groove and the shaft shoulder with a second groove.

20 Claims, 3 Drawing Sheets

(56) References Cited

U.S. PATENT DOCUMENTS

2007/0110348 A1* 5/2007 Obara .................. F16C 33/107
                                                        384/107
2007/0193408 A1* 8/2007 Martinez ................ A01D 34/30
                                                         74/609

* cited by examiner

GEARBOX ASSEMBLY

CROSS-REFERENCE TO RELATED APPLICATIONS

This application claims priority to German Patent Application Ser. No. 102023129240.4, filed Oct. 24, 2023, the disclosure of which is hereby incorporated by reference in its entirety.

DESCRIPTION

The present disclosure relates to a gearbox assembly.

BACKGROUND

Gearbox assemblies are known to have gearbox stages arranged at an angle to each other with gear shafts arranged one in another. Gear assemblies with gear shafts arranged inside each other represent, among other things, a compact design and a possibility for the realization of eccentric drives. Gearbox assemblies with eccentric drive are used, for example, in agriculture to drive cutter bars of headers for combine harvesters.

A gearbox assembly is disclosed, for example, in U.S. Pat. No. 6,273,214B1, International Publication Ser. No. WO2006/013188A2, and European Patent No. 2979530A1. The gearbox assembly has a gearbox housing in which a gearbox shaft is mounted and which can be driven via an angular gear stage and has an eccentrically located cavity. An eccentric shaft is mounted in the cavity. To ensure a sufficiently high supply of lubricant to the cavity, a channel is provided that connects an area of the gearbox housing with the cavity of the shaft. Through the channel, a lubricant deposited in the transmission housing can enter the cavity. However, the problem is that elements (e.g., seals) located in the lower part of the gearbox that close the cavity outwardly or a bearing located between the second and first shafts are not optimally supplied with lubricant and thus not cooled by the lubricant under all operating conditions.

The present disclosure provides a gearbox assembly of the type mentioned above, by which one or more of the aforementioned problems are overcome or reduced.

SUMMARY

In the present disclosure, one or more examples of a gearbox assembly are described in which lubricant reaches the inside and the side adjacent to the end of the shaft area of a bearing located in the first bearing area and the seal by gravity, capillary action, or centrifugal force. The one or more example gearbox assemblies lubricates and cools the bearing or seal to overcome or reduce the aforementioned problems.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
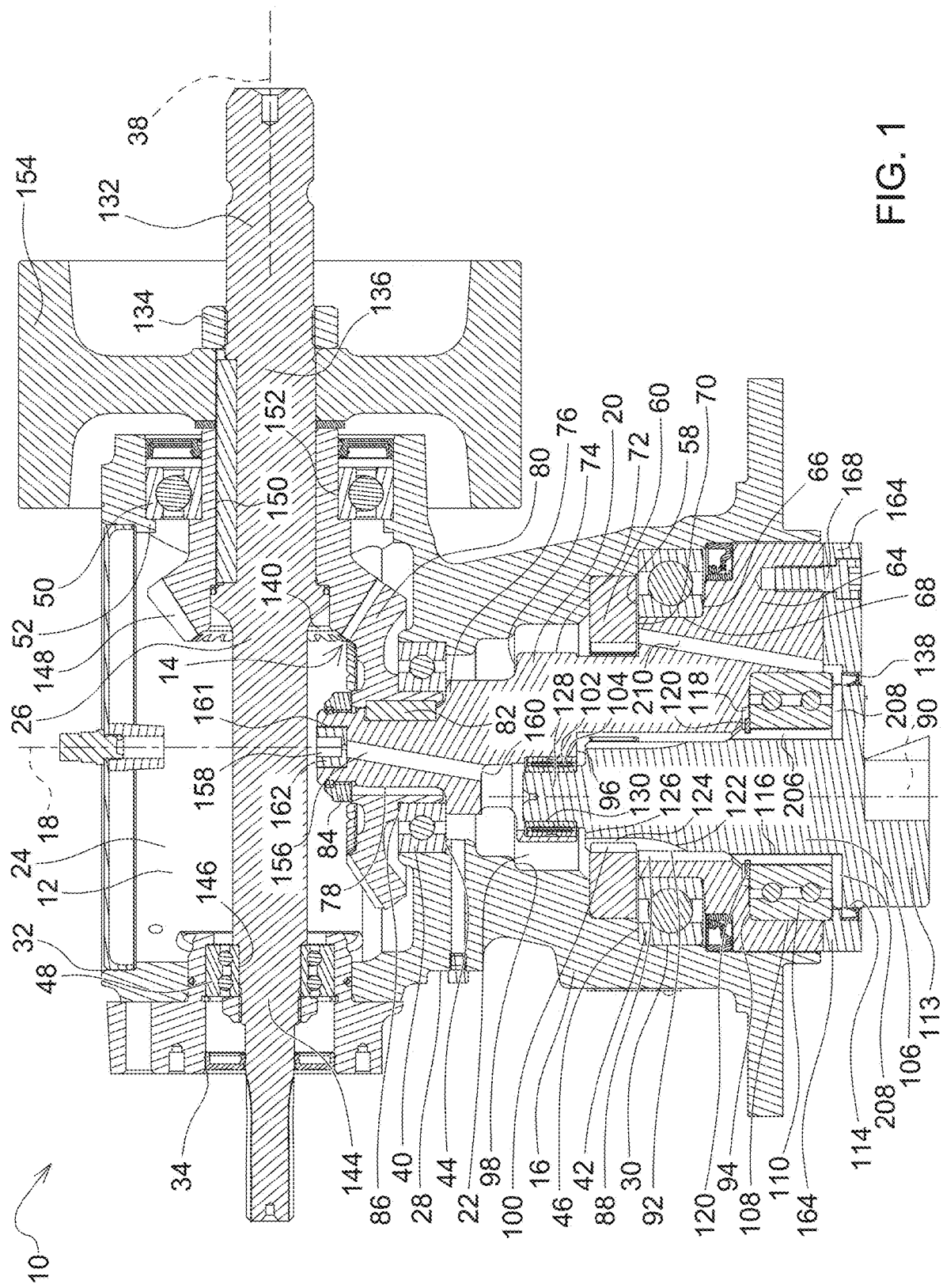
FIG. 1 is a cross-sectional view as gearbox assembly according to the present disclosure.

FIG. 1 shows a cross-section through a gearbox assembly 10 with a gearbox housing 16 surrounding a transmission space 12 of an angular transmission 14. The gearbox housing 16 extends generally rotationally symmetrically along the axis of rotation 18 of a first shaft 20, wherein the axis of rotation 18 defines a longitudinal direction of the gearbox assembly 10. The transmission space 12 is divided into a first transmission housing area 22, which essentially surrounds the first shaft 20, and a second transmission housing area 24, which essentially surrounds a third shaft 26 arranged transversely to the longitudinal direction. The transmission housing areas 22, 24 are designed to be adjacent to each other in the longitudinal direction and have a common, cylindrical transition area 28, which is arranged approximately in the middle of the longitudinal expansion of the gearbox housing 16 and coaxially to the axis of rotation 18 and by which an axial connection of the transmission housing areas 22, 24 is defined.

The gearbox housing 16 has a first cylindrical opening 30 in the first transmission housing area 22, which is oriented coaxially to the axis of rotation 18 and opens the first transmission housing area 22 axially outwards. Furthermore, the gearbox housing 16 has a second, third and fourth cylindrical opening 32, 34, 36 in the second transmission housing area 24. The second opening 32 is aligned coaxially to the axis of rotation 18 and opens the second transmission housing area 24 axially outwards. The third and fourth openings 34, 36 are arranged on both sides of the axis of rotation 18 and coaxially to a rotation axis 38 of the third shaft 26 arranged transversely to the axis of rotation 18.

In the common transition area 28 there is a first bearing 40 and in the first opening 30 in the first transmission housing area 22 a second bearing 42 for the first shaft 20 arranged. A shoulder 44 is molded into the common transition area 28, which axially fixes the bearing 40 in the direction of the first opening 30. At the first opening 30, a shoulder 46 is molded in, which axially fixes the bearing 42 in the direction of the common transition area 28. Bearings 40 and 42 may be designed as roller bearings and are shown in FIG. 1, for example, as ball bearings. The first shaft 20 is accommodated by bearings 40 and 42 and mounted in a rotatable manner in the gearbox housing 16 or in the first transmission housing area 22.

In the second transmission housing area 24, a housing cover 47 is provided at the second opening 32, which axially delimitates the second transmission housing 24 to the surrounding area. In the second transmission housing area 24, a first bearing 48 is arranged in the third opening 34 and a second bearing 50 for the third shaft 26 in the fourth opening 36. A shoulder 52 is molded into the fourth opening 36, which axially fixes the bearing 50 in the direction of the third opening 34. Bearing 48 is freely stored in the third opening 34. Bearings 48, 50 are designed as roller bearings, wherein a roller bearing in the form of a needle roller bearing is used for bearing 48, as shown in FIG. 1. The bearing 50 is designed as a ball bearing in the form shown, whereby a roller bearing can also be used here. The third shaft is accommodated by bearings 48 and 50 and mounted in a rotatable manner in the gearbox housing 16 or in the second transmission housing area 24.

Furthermore, in the first transmission housing area 22 between bearings 40, 42, a further shoulder 58 is provided, to which a ring gear 60 is attached. The ring gear 60 is bolted to the gearbox housing 16 by screws distributed on the circumference of shoulder 58.

The first shaft 20 extends through the entire first gear housing area 22 and has a shaft end range 64 protruding from the first opening 30, which essentially covers the entire diameter of the first opening 30. Starting from the shaft end range 64, a first shaft shoulder 66 is formed, which is followed by a bearing area 68 for the second bearing 42. Adjacent to the bearing area 68 is a second shaft shoulder 70, which is followed by a middle shaft range 72. The middle shaft range 72 leads to a third shaft shoulder 74. The third shaft shoulder 74 is followed by a fourth shaft shoulder 76, which is followed by a shaft journal 78, wherein the shaft journal 78 extends through the common transition area 28 into the second transmission housing area 24. A first bevel gear 80 is mounted on the shaft journal 78, which is torsionally connected to the first shaft 20 or to the shaft journal 78 via a spring-groove connection 82. The shaft journal 78 is equipped with a shaft nut 84. On the first bevel gear 80, a bearing area 86 is formed, through which the first shaft 20 is accommodated in the first bearing 40.

The first shaft 20 is provided with a cavity 88. The cavity 88 is essentially cylindrical about an axis of rotation 90, wherein the axis of rotation 90 is arranged parallel to the axis of rotation 18 and eccentric to the first shaft 20. The cavity 88 has a cylindrical opening 92 which opens the cavity 88 axially to the axis of rotation 90 to the shaft end 64 of the first shaft 20. Starting from the opening 92, the cavity 88 has a first and a second shoulder 94, 96 and opens into a cavity floor 98. Between the first and second shoulders 94, 96, the ring gear 60 is provided with at least one opening 100 extending radially and axially to the axis of rotation 90. In one possible embodiment, two or more openings 100 are in particular uniformly distributed around the inner opening of the ring gear 60.

Between the second shoulder 96 of the cavity 88 and the cavity floor 98, a first bearing seat 102 is designed to accommodate a first bearing 104 for a second shaft 106. Between the opening 92 of the cavity 88 and the first shoulder 94, a second bearing seat 108 is formed (on a plate 164) to accommodate a second bearing 110 for the second shaft 106.

The first and second bearings 104, 110 for the second shaft 106 are designed as roller bearings, wherein a roller bearing in the form of a needle bearing is provided for the first bearing 104 and a ball bearing for the second bearing 110, as shown in FIG. 1.

Figure 2:
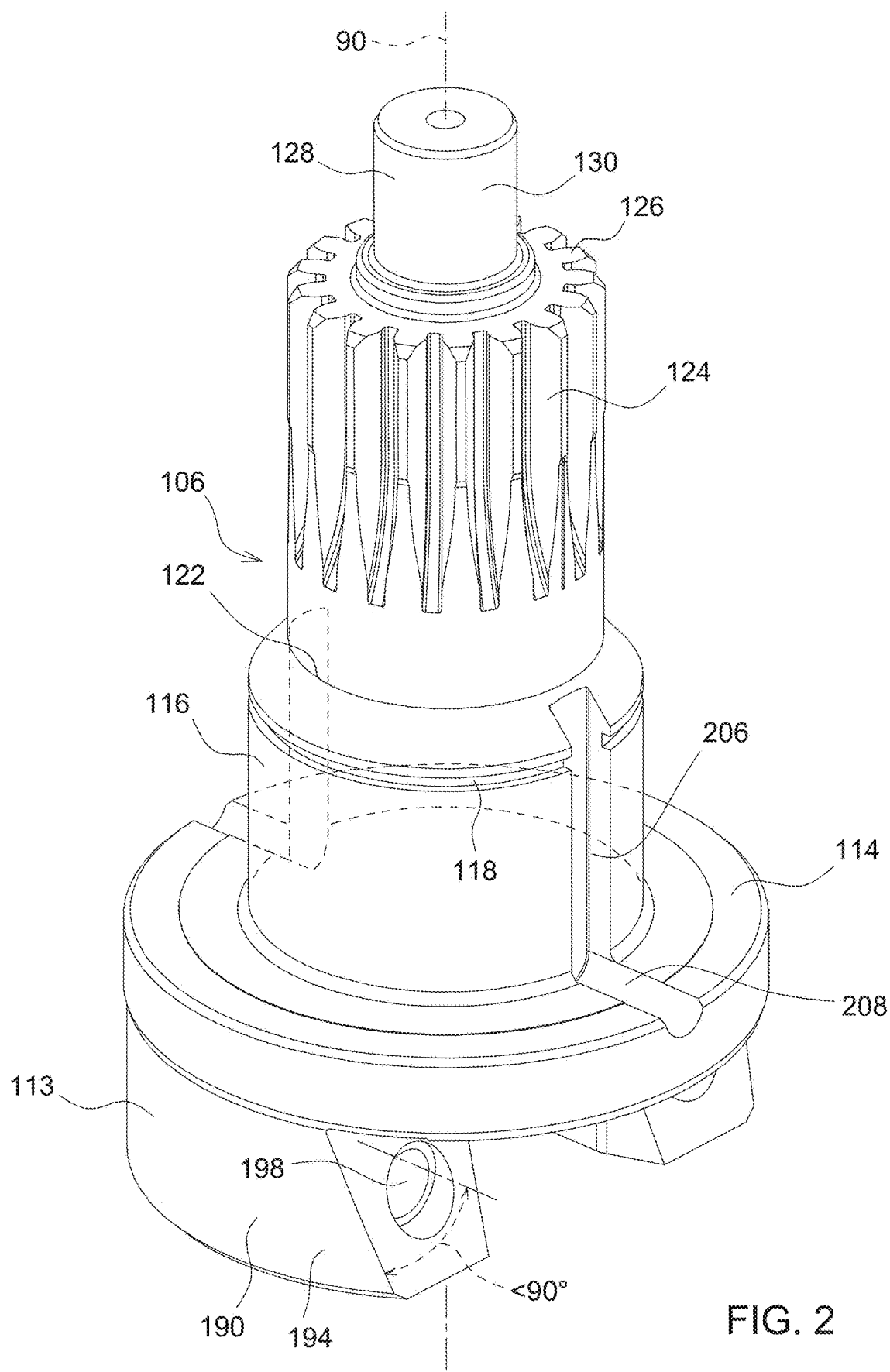
FIG. 2 is a perspective view of the second shaft of FIG. 1.

The second shaft 106 extends through the entire cavity 88 of the first shaft 20 and has a shaft end region 113 protruding from the first opening 92 of the first shaft 20 (see FIG. 2). Starting from the shaft end area 113, the second shaft 106 is provided with a first shaft shoulder 114, which is followed by a bearing area 116 for the second bearing 110. Adjacent to the bearing area 116 is an annular groove 118 that accommodates a snap ring 120. The annular groove 118 is followed by a second shaft shoulder 122 at the top, which leads into a gear area 124 of the second shaft 106. The gear area 124 of the second shaft 106 extends axially between shoulders 94, 96 of the cavity 88 and ends in a third shaft shoulder 126. The third shaft shoulder 126 is followed by a shaft journal 128, on which a bearing area 130 is formed for the first bearing 104. Below the second bearing 110, an annular seal 138 made of an elastomeric material is provided in the radial direction between the shaft end region 113 of the second shaft 106 and a plate 164 attached from below to the shaft end range 64 of the first shaft 20, which is attached to it by one or more screws 168. In this respect, reference is made also to FIG. 3.

The third shaft 26 extends through the entire second transmission housing area 24 and has a shaft end range 132 protruding from the fourth opening 36. The shaft end section 132 is provided with a shaft nut 134. Starting from the end-of-shaft region 132, the third shaft 26 has a shaft region 136, which is followed by an annular groove, with a portion of the shaft region 136 protruding from the fourth aperture 36. A snap ring 140 is included in the ring groove. Between the annular groove and the third opening 34, a shoulder is provided, which is followed by a shaft journal 144 extending through the third opening 34 to the outside. The third opening 34 is closed by a cap. A bearing area 146 is formed on the shaft journal 144, which is accommodated by the first bearing 48 of the second transmission housing area 24, which bearing 48 is held between a shoulder of the cap and a shaft nut on the shaft journal 144. A second bevel gear 148 is mounted on the shaft region 136, which is torsionally connected to the third shaft 26 via a spring-groove connection 150. On the second bevel gear 148, a bearing area 152 is formed through which the third shaft 26 is accommodated in the second bearing 50. Furthermore, a pulley 154 is provided on the part of the shaft region 136 protruding from the fourth opening 36, which is also torsionally connected to the third shaft 26 via the spring-groove connection 150.

The shaft journal 78 of the first shaft 20 is provided with a channel 156 which, starting from the end of the shaft journal 78, has a gear housing opening 158 and a cavity opening 160. The gearbox housing opening 158 is arranged concentrically to the axis of rotation 18 of the first shaft 20. The cavity opening 160 of channel 156 is arranged eccentrically to the axis of rotation 18 of the first shaft 20 in the region of the cavity floor 98. The gearbox housing opening 158 is provided with a thread 161 and a component 162, in particular a locking plug, which is designed as a hexagon socket screw. The component 162 is provided with a bore. The component 162 and the bore are arranged concentrically to the axis of rotation 18.

The shaft end region 113 of the second shaft 106 has connection means 190 formed in the form of a radially connecting flange assembly, as shown in FIG. 2. The connection means 190 includes a U-shaped elevation protruding axially from the shaft end region 113 of the second shaft 106, which has two legs 194 extending transversely to the axis of rotation 90 on the end face of the shaft end area 113. A free space is formed between the legs 194. Tapped holes 198 are provided on the end faces of legs 194, wherein the end faces of legs 194 enclose an angle smaller than 90° with the bottom of the free space 196.

The gearbox assembly 10 is provided with a journal assembly connected to the shaft end section 113 of the second shaft 106. The journal assembly has a pin with a tenon axis and connection means in the form of a radially connecting flange arrangement. The connection means include a plate from which a web extends in the radial direction to the pin axis. The slab has a height that is essentially equal to the height of the U-shaped elevation. The pin extends axially to the pin axis from the plate. The bridge is designed in such a way that it essentially has the shape and size of the free space. On the side of the web, connecting surfaces are formed which are beveled according to the end surfaces of the legs 194. The plate is provided with holes that are adapted in size and spacing to the threaded holes 198. The pin is also provided with a threaded hole concentrically arranged to the pin axis on its end face.

The shaft end area is also provided with a cap (not shown in the figures). The cap has the shape of a cylindrical pot, with a bottom, a wall area and a wreath that protrudes radially over the wall area of the cap. The cap is provided with a cut-out below the wreath, which exposes the wall area over half the circumference of the pot and the bottom in a semicircle so that the cap in the wall area over half the circumference is only formed by a remaining narrow ring and by the wreath. A mounting hole for the cap is provided in the bottom through which the cap is fixed with a screw in the threaded hole of the shaft end area 113 of the second shaft 106.

The tenon assembly is provided with a bearing assembly connected to connection means for driving a knife bar of a cutting platform (not shown). The connection means are designed in the form of a guide rod and are connected by a connecting rod and screw connections to a cutting unit mechanism (not shown).

The gearbox assembly 10 is driven by the pulley 154 on the third shaft 26. The first shaft around the axis of rotation 18 is driven by the angular gear formed by the two bevel gears 80, 148. On the one hand, the rotational movement of the first shaft 20 initiates a rotational movement of the second shaft 106 around the axis of rotation of the first shaft 20, but on the other hand, it also causes a proper rotation of the second shaft 106 around the axis of rotation 90 since the second shaft 106 engages with a suitable internal toothing of the ring gear 60 via the gear area 124. The tenon assembly 202 connected via the connection means 190 to the shaft end region 113 of the second shaft 106, which is arranged eccentrically to the axis of rotation of the second shaft 106, thus undergoes an eccentric rotational motion around the axis of rotation 18 of the first shaft 20 which is superimposed by an eccentric rotational motion around the axis of rotation 90 of the second shaft 106.

Further details of the gearbox assembly 10 and the connection of a mower bar to the end of the shaft end region 113 are shown in documents U.S. Pat. No. 6,273,214B1, International Publication Ser. No. WO2006/013188A2, and European Patent No. 2979530A1, the disclosures of which are incorporated by reference herein.

The second transmission housing area 24 is filled with lubricant at least up to the level of the transmission housing opening 158 of channel 156. The lubricant may be oil or grease (which, as a rule, becomes liquid at the operating temperature of the gearbox assembly 10). The lubricant passes through channel 156 downwards into the transmission housing area 22 (or is already present there), which forms a reservoir for lubricant. From there, the lubricant runs down along the surface of the second shaft 106 by capillary action, gravity and movement of the components. Accordingly, in the case of a gearbox assembly 10, the lubricant from the transmission housing area 22 passes through the gap between the ring gear 60 and the gear area 124 and through the opening 100 into the cavity 88 which is located in the axial direction of the first shaft 20 and second shaft 106 between the ring gear 60 and the snap ring 120. Through the gap between the annular groove 118 and the snap ring 120, the lubricant passes further down into the bearing area 116 and thus to the bearing 110. The lubricant may pass to seal 138 through the vertical gap between the bearing 110 and the second shaft 106 and the horizontal gap between bearing 110 and the plate 164 downwards and outwards.

The flow of the lubricant between the cavity 88 and the bearing 110 therefore takes place through a relatively narrow path which applies to an even greater extent for the seal 138.

This can lead to the bearing 110 or the seal 138 not being supplied with lubricant or being supplied with too little, heating up and being damaged. Damage to the seal 138 may ultimately result in leakage of the lubricant from the second gear housing area 24 and damage to bearings 40, 110.

Figure 3:
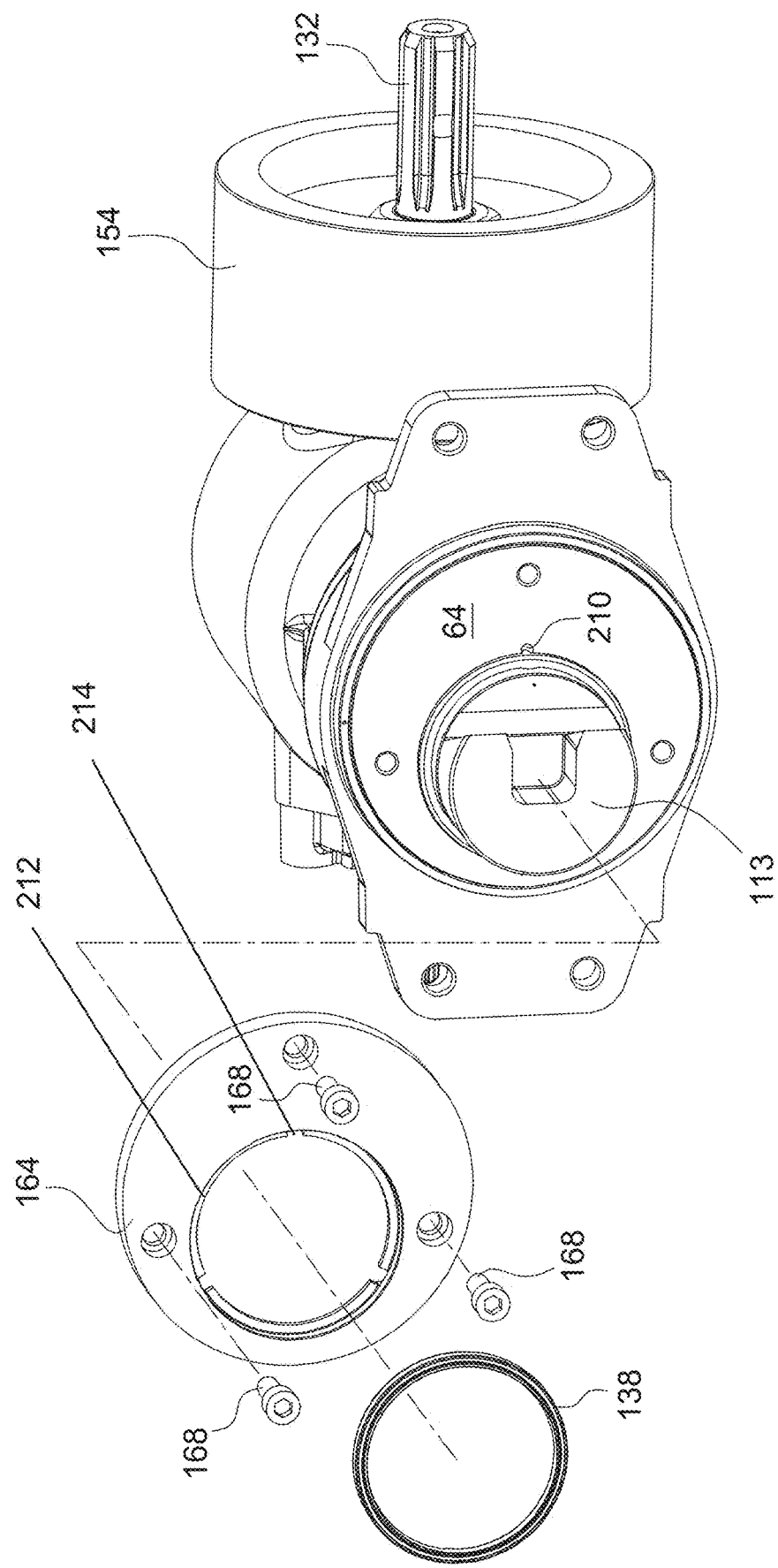
FIG. 3 is a perspective view of the gearbox assembly from below with dismounted seal and plate used as cover.

In order to avoid these problems, a first groove 206 is provided in the bearing area 116, which begins above the annular groove 118 and extends from there in the axial direction of the second shaft 106 downwards to the first shaft shoulder 114. The first groove 206 is followed by a second groove 208, which extends radially at the top of the shaft shoulder 114. This second groove 208 is located below the bearing 110. In this way, by gravity, capillary action and centrifugal forces, lubricant is continuously passed through the grooves 206, 208 from the cavity 88 to the bearing 108 and to the seal 138 and these two are continuously cooled and lubricated, therefore do not run dry. Excess lubricant is directed from the outer end of the second groove 208 through a channel 210 in the first shaft 20 to the underside of the ring gear 60 and thus to the opening 100, through which it passes upwards into the gear housing area 22. As shown in FIG. 3, plate 164 includes at its inner opening through which the shaft end area 113 extends and in which the seal 138 is located, on its inner circumferential area facing towards the interior of the transmission housing 16 a border 212 extending radially towards the interior, on which the seal 138 abuts from the outside (i.e., in the drawings and in the operative position from below). In the border 212, three recesses 214 are provided, distributed around the circumference, through which lubricant can reach the seal 138 from the top (i.e., from the groove 208 respectively from the interior side of plate 164). One of the recesses 214 is aligned with the channel 210. The seal 138 is pressed during mounting of the transmission assembly 10 from the outside (below) into the gap between the shaft end area 113 and the plate 164 and fixed there in this manner.

In one possible embodiment, two (as shown in FIG. 2) or more grooves 206, 208 are in particular uniformly distributed around the circumference of the second shaft 106.

The invention claimed is:

1. A gearbox assembly, comprising:
   a gearbox housing,
   a transmission space enclosed by the gearbox housing,
   a first shaft mounted in the gearbox housing,
   a cavity formed in the first shaft with a cross-sectional center of gravity eccentrically to an axis of rotation and,
   a channel formed in the first shaft connecting the transmission space and the cavity of the first shaft for supplying lubricant therebetween,
   wherein, in the cavity of the first shaft, a second shaft is rotatably mounted, the second shaft having a first bearing area, a second bearing area, a gear area engaged with a torsionally connected toothing of a ring gear to the gearbox housing, and an axially protruding shaft end range from the cavity of the first shaft,
   wherein the first bearing area is arranged between the gear area and a shaft end area, the gear area being arranged between the first bearing area and the second bearing area,
   wherein a seal located adjacent to the shaft end area is configured to seal the cavity, and an outer diameter of the second shaft between the first bearing area and the shaft end area is stepped at a shaft shoulder,
   wherein the first bearing area comprises a first axially extending groove and the shaft shoulder comprises a second, radially extending groove, the second groove being directly connected to the first groove.

2. The gearbox assembly according to claim 1, wherein, in the first shaft, a channel is defined extending from the radially outer end of the second groove to the ring gear.

3. The gearbox assembly according to claim 1, wherein, in the ring gear, at least one opening is defined extending parallel to the axes of the first and second shafts.

4. The gearbox assembly according to claim 1, wherein an annular groove is formed on the first shaft between the gear area and the first bearing area, the annual groove receiving a snap ring for axial fixation of the second shaft,
wherein the first groove extends on both sides of the annular groove.

5. The gearbox assembly according to claim 1, wherein the seal extends radially between the shaft end region and a cover plate connected to the first shaft.

6. The gearbox assembly according to claim 5, wherein the cover plate comprises at its inner opening an upper border extending radially inwards, where the shaft end area extends through the inner opening and in which the seal is positioned.

7. The gearbox assembly according to claim 6, wherein the seal abuts the upper border.

8. The gearbox assembly according to claim 7, further comprising one or more recesses are formed in the upper border, the one or more recesses disposed about a circumference and through which a lubricant is fluidly connected to the seal on an interior side of the cover plate.

9. The gearbox assembly according to claim 8, wherein one of the recesses is aligned with the channel.

10. The gearbox assembly according to claim 1, wherein a bearing is located in the first bearing area, the second groove being located on a side of the bearing positioned adjacent to the seal.

11. The gearbox assembly according to claim 1, further comprising a third shaft mounted in the gearbox housing, the third shaft being rotatably driven about a third axis of rotation which is oriented at an angle within a plane lying on the axis of rotation of the first shaft.

12. The gearbox assembly according to claim 11, further comprising a first gear mounted on the first shaft, the first gear engaging with a third gear fixed on the third shaft.

13. The gearbox assembly according to claim 12, wherein the axes of the first and second shafts are arranged at least approximately vertically during operation.

14. An agricultural header, comprising:
a mower bar; and
a gearbox assembly comprising:
a gearbox housing,
a transmission space enclosed by the gearbox housing,
a first shaft mounted in the gearbox housing,
a cavity formed in the first shaft with a cross-sectional center of gravity eccentrically to an axis of rotation and,
a channel formed in the first shaft connecting the transmission space and the cavity of the first shaft for supplying lubricant therebetween,
wherein, in the cavity of the first shaft, a second shaft is rotatably mounted, the second shaft having a first bearing area, a second bearing area, a gear area engaged with a torsionally connected toothing of a ring gear to the gearbox housing, and an axially protruding shaft end range from the cavity of the first shaft,
wherein the first bearing area is arranged between the gear area and a shaft end area, the gear area being arranged between the first bearing area and the second bearing area,
wherein a seal located adjacent to the shaft end area is configured to seal the cavity, and an outer diameter of the second shaft between the first bearing area and the shaft end area is stepped at a shaft shoulder,
wherein the first bearing area comprises a first axially extending groove and the shaft shoulder comprises a second, radially extending groove, the second groove being directly connected to the first groove;
wherein, the shaft end range is operably connected to the mower bar.

15. The agricultural header according to claim 14, wherein, in the first shaft, a channel is defined extending from the radially outer end of the second groove to the ring gear.

16. The agricultural header according to claim 14, wherein, in the ring gear, at least one opening is defined extending parallel to the axes of the first and second shafts.

17. The agricultural header according to claim 14, wherein an annular groove is formed on the first shaft between the gear area and the first bearing area, the annual groove receiving a snap ring for axial fixation of the second shaft,
wherein the first groove extends on both sides of the annular groove.

18. The agricultural header according to claim 14, wherein the seal extends radially between the shaft end region and a cover plate connected to the first shaft.

19. The agricultural header according to claim 18, wherein the cover plate comprises at its inner opening an upper border extending radially inwards, where the shaft end area extends through the inner opening and in which the seal is positioned;
wherein the seal abuts the upper border;
wherein one or more recesses are formed in the upper border, the one or more recesses disposed about a circumference and through which a lubricant is fluidly connected to the seal on an interior side of the cover plate.

20. The agricultural header according to claim 19, wherein one of the recesses is aligned with the channel.

* * * * *